US007166660B2

(12) United States Patent
Staniek

(10) Patent No.: US 7,166,660 B2
(45) Date of Patent: Jan. 23, 2007

(54) PHOSPHORUS COMPOUNDS AS STABILIZERS

(75) Inventor: Peter Staniek, Binzen (DE)

(73) Assignee: Clariant GmbH, Frankfurt (DE)

(*) Notice: Subject to any disclaimer, the term of this patent is extended or adjusted under 35 U.S.C. 154(b) by 54 days.

(21) Appl. No.: 10/480,676

(22) PCT Filed: Jun. 17, 2002

(86) PCT No.: PCT/IB02/02308

§ 371 (c)(1),
(2), (4) Date: Dec. 12, 2003

(87) PCT Pub. No.: WO02/102886

PCT Pub. Date: Dec. 27, 2002

(65) Prior Publication Data

US 2004/0171723 A1    Sep. 2, 2004

(30) Foreign Application Priority Data

Jun. 19, 2001  (CH) ...................................... 1122/01

(51) Int. Cl.
*C08K 5/50* (2006.01)
(52) U.S. Cl. ...................................... 524/121; 524/154
(58) Field of Classification Search ................. 524/121, 524/154
See application file for complete search history.

(56) References Cited

U.S. PATENT DOCUMENTS

| 2,981,716 | A | 4/1961 | Street et al. |
| 3,637,907 | A | 1/1972 | Mathis et al. |
| 5,488,079 | A | 1/1996 | Staniek |
| 5,627,256 | A | 5/1997 | Meier et al. |
| 5,852,138 | A | 12/1998 | Meier et al. |
| 5,969,014 | A | 10/1999 | Webster et al. |
| 5,986,098 | A | 11/1999 | Staniek |
| 6,103,796 | A | 8/2000 | Staniek et al. |
| 6,369,140 | B1 | 4/2002 | Staniek |
| 2003/0020048 | A1 | 1/2003 | Krohnke et al. |

FOREIGN PATENT DOCUMENTS

| DE | 19961464 | 6/2001 |
| WO | WO 0206390 | 1/2002 |

OTHER PUBLICATIONS

"Kunststoff—Additive" [Plastics Additives]; Gachter & Muller, 3rd Ed., pp. 42-50 (1990).

*Primary Examiner*—Peter Szekely
(74) *Attorney, Agent, or Firm*—Anthony A. Bisulca

(57) ABSTRACT

The present invention relates to phosphorus compounds as stabilizers for polymers with respect to exposure to heat or mechanical stress during processing. In particular, even very small concentrations of from 25 to 350 ppm of bis(diphenylphosphino)-2,2-dimethylpropane are highly effective.

6 Claims, No Drawings

PHOSPHORUS COMPOUNDS AS STABILIZERS

The present invention relates to phosphorus compounds as stabilizers for polymers with respect to exposure to heat or mechanical stress during processing.

The prior art describes many phosphorus compounds which can be used to stabilize polymeric compounds during processing (see, for example, "Kunststoff-Additive" [Plastics additives]—Gächter and Müller, 3$^{rd}$ Edn., 1990). Mention may be made here in particular of the phosphite and phosphonite classes of compounds, whose use extends to the industrial scale. These stabilizers reduce damage to the polymer through exposure to heat or mechanical stress during processing.

A disadvantage of these compounds is relatively pronounced susceptibility to hydrolysis and the need to use amounts in the range above 500 ppm in order to achieve sufficient stabilizing action. The precise amounts used naturally depend on the application sector envisaged and on the polymer type, and always have to be determined in suitable trials.

Another group of compounds suitable in principle is that of the phosphanes, which unlike the phosphites and phosphonites contain no hydrolysable P—O bonds. No hydrolysis can therefore occur with these compounds. Nevertheless, this class of compound is not in practice used on any commercial scale. However, the patent literature has references to their suitability as stabilizers (e.g. U.S. Pat. No. 3,637,907, U.S. Pat. No. 2,981,716). From the examples given in those references it is possible to see that the concentration range used for the compounds which they describe is the same as that for conventional stabilizers. It is possible to conclude that the structure here gives no substantial advantage in effectiveness over the stabilizers used hitherto.

U.S. Pat. No. 5,852,138 disclsoses stabilizer mixtures and their use in polycarbonates, wherein the stabilzer mixtures comprise the combination of phosphines and silicon compounds. In the examples 1,2-bis-(diphenylphoshino)ethane and 1,4-bis-(diphenylphoshino)butane are applied in 1:4 mixtures with silanes in polycarbonate at a concentration of 0.2 wt %.

U.S. Pat. No. 5,627,256 discloses polycarbonates containing aryl phosphines. In the examples 1,2-bis-(diphenylphoshino)ethane and 1,4-bis-(diphenylphoshino)butane are applied in polycarbonate at a concentration of 0.1 wt %.

U.S. Pat. No. 3,637,907 discloses polyolefins stabilized with diphosphines. In column 2, line 8–11 it is stated that "the amount of the alkylene diphosphine necessary to provide effective stabilization is between about 0.1 and 3 pounds of the phosphine per 100 pounds of the polyolefin to which the phosphine is added. In Example 1 of D3 an amount of 0.13 wt % of ethylene bis(diphenylphosphine) is applied in polypropylene, whereas in example 2 of D3 an amount of 0.1 wt % of ethylene bis(diphenylphosphine) is applied in polypropylene.

U.S. Pat. No. 5,488,079 discloses the stabilization of polyolefins with phosphines which are preferably applied in amounts of 0.02 to 1 wt %. In example 6 tris-(4-methyl-phenyl)phosphine is applied in PP in an amount of 0.04 wt %, whereas in example 7 tris-(4-methyl-phenyl)phosphine is applied in PP in an amount of 0.07 wt %.

Surprisingly, it has now been found that compositions which comprise one or more polymers, in particular polyolefins (component a)) and one or more compounds of the formulae (I) to (IV) (component b)) have significantly high stability, even when the concentration range for b) is very low. The criterion for stabilizing action is the maintenance of the initial molecular weight of the polymer in the melt after the polymer has been processed and, respectively, the technical determination of the same by measuring the melt flow index (MFI) and/or measuring the discoloration arising as a result of processing.

On the basis of the experiments carried out it can be assumed that sufficient stabilizing action can be achieved even in the range from 5 to 500 ppm, preferably from 10 to 400 ppm, and in particular from 25 to 350 ppm, based in each case on component a).

The invention therefore provides compositions comprising as component a) one or more polymers and as component b) one or more compounds of the formula (I)

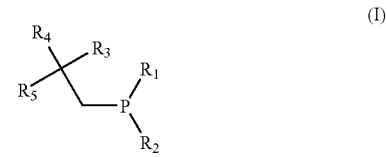

(I)

where, independently of one another $R_1$, $R_2$ are $C_{1-18}$-alkyl, linear or branched; $C_{5-8}$-cycloalkyl; $C_{6-24}$-aryl/heteroaryl; $C_{7-25}$-aryl/heteroaryl, where appropriate mono- to pentasubstituted with $C_{1-12}$-alkyl, linear or branched, with $C_{1-12}$-alkoxy, linear or branched, with $C_{5-8}$-cycloalkyl or with phenyl; and $R_3$, $R_4$, and $R_5$ are H, $C_{1-18}$-alkyl, linear or branched; $C_{5-8}$-cycloalkyl; $C_{6-24}$-aryl; $C_{7-25}$-alkylaryl; the groups —P($R_1$)($R_2$), —CH$_2$—P($R_1$)($R_2$), —CH$_2$—OH, —CH$_2$—Cl, —CH$_2$—Br; or $C_{7-24}$-aryl, where appropriate mono to pentasubstituted with $C_{1-12}$-alkyl, linear or branched, with $C_{1-12}$alkoxy, linear or branched, with $C_{5-8}$-cycloalkyl or with phenyl.

Preference is given to compounds of the formula (I) where $R_1'$, and $R_2'$ are $C_{6-18}$-alkyl, linear or branched; $C_{6-8}$-cycloalkyl; $C_{6-18}$-aryl or $C_{7-25}$-aryl, where appropriate mono- to trisubstituted with $C_{1-8}$-alkyl, linear or branched, with $C_{1-8}$-alkoxy, linear or branched, with $C_{6-8}$-cycloalkyl or with phenyl; and $R_3'$, $R_4'$, and $R_5'$ are H, $C_{1-12}$-alkyl, linear or branched; $C_{6-8}$-cycloalkyl; $C_{6-18}$-aryl; $C_{7-25}$-alkylaryl; the groups —P($R_1'$)($R_2'$), —CH$_2$—P($R_1'$)($R_2'$), —CH$_2$—OH, —CH$_2$—Cl or —CH$_2$—Br; $C_{7-24}$-aryl, where appropriate mono- to trisubstituted with $C_{1-8}$-alkyl, linear or branched, with $C_{1-8}$-alkoxy, linear or branched, with $C_{6-8}$-cycloalkyl or with phenyl.

Particular preference is given to compounds of the formula (I) where $R_1''$, and $R_2''$ are $C_{6-8}$-cycloalkyl; phenyl; phenyl where appropriate mono- to trisubstituted with $C_{1-8}$-alkyl, linear or branched or with $C_{1-8}$-alkoxy, linear or branched; and $R_3''$, $R_4''$, and $R_5''$ are $C_{1-8}$-alkyl, linear or branched; phenyl; $C_{7-19}$-alkylaryl; the groups —CH$_2$—P($R_1''$)($R_2''$), —CH$_2$—OH, —CH$_2$—Cl; or phenyl, where appropriate mono- to trisubstituted with $C_{1-8}$-alkyl, linear or branched or with $C_{1-8}$-alkoxy, linear or branched.

The compounds

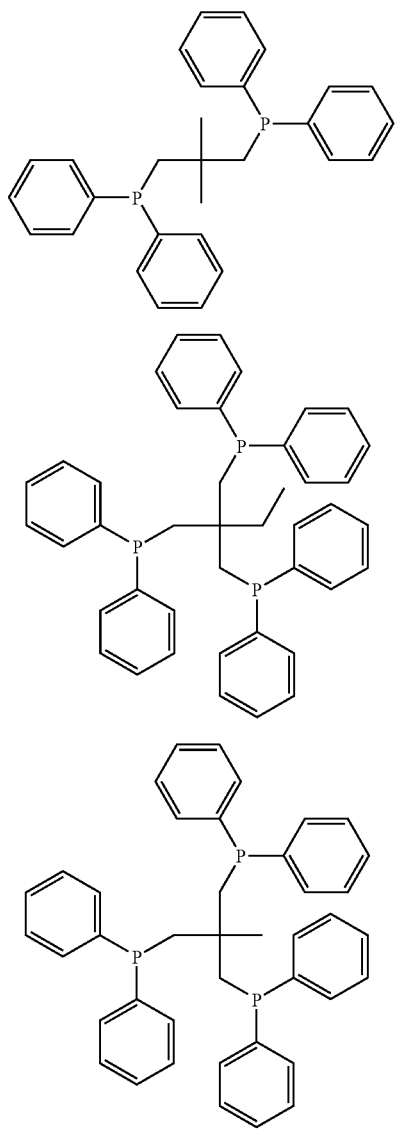

are of very particular importance.

The compounds of the formulae (I) to (IV) may be prepared from known compounds with the aid of known processes. An overview of these preparation processes is given by way of example in G. M. Kosolapoff, Organic Phosphorus Compounds, Volume 1–7, Wiley, New York, 1972 or Houben/Weyl, Methoden der Organischen Chemie [Methods of organic chemistry], Volume 12, 4$^{th}$ Edition, Georg Thieme Verlag, Stuttgart 1963 and the appropriate supplementary volumes. The contents of these are incorporated herein by way of reference.

These compounds are characteristically prepared from organohalogen compounds, such as alkyl or aryl chlorides or alkyl or aryl bromides and PCl$_3$ using a Grignard or modified Wurtz reaction, using a Friedel-Crafts reaction, by adding a P—H-containing compound to multiple bonds, by alkylating or arylating P—H compounds, using the Arbuzov reaction of diorganophosphonites with organohalides, followed by reduction steps, or by derivatizing previously formed phosphanes.

The amount of component b) present in the composition is preferably from 5 to 500 ppm, with preference from 10 to 400 ppm, and in particular from 25 to 350 ppm, based in each case on the weight of the polymer a).

Other additives which may be added to a polymeric formulation of the invention encompass antioxidants, such as sterically hindered phenols, secondary aromatic amines or thioethers (as described in "Kunststoff-Additive" [Plastics additives]—Gächter and Müller, 3$^{rd}$ Edn., 1990, p. 42–50, the content of which is incorporated herein by way of reference); acid scavengers such as sodium stearate, magnesium stearate, zinc stearate and calcium stearate, and sodium lactate, magnesium lactate, zinc lactate and calcium lactate, hydrotalcites or alkoxylated amines; UV stabilizers, and also other sterically hindered amines (such as N-unsubstituted, N-alkyl, N—O-alkyl or N-acyl substituted 2,2,6,6-tetramethylpiperidine compounds) [also known as hindered amine light stabilizers (HALSs)] and UV absorbers (such as 2-(2'-hydroxy-phenyl)benzotriazoles, 2-hydroxybenzophenones, (2-hydroxyphenyl)triazines, 1,3-bis(2'-hydroxybenzoyl)benzosalicylates and -cinnamates and oxamides), UV quenchers, such as nickel complexes, benzoates and substituted benzoates, antistats, flame retardants, lubricants, plasticizers, nucleating agents, metal deactivators, biocides, impact modifiers, fillers, pigments and fungicides.

Component b) may be added to the polymeric material a) prior to, during or following the preparation process, and the addition may use a solid or molten form or a solution or suspension, preferably a liquid concentrate comprising from 10 to 80% by weight of component b) and from 90 to 20% by weight of the solvent, or a solid concentrate composition (masterbatch) comprising from 10 to 80% by weight (in particular from 40 to 70% by weight) of component b) and from 90 to 20% by weight (in particular from 60 to 30% by weight) of a solid polymeric material which is identical or compatible with the material to be stabilized.

Component b) may, moreover, be in the form of mixtures with other additives, e.g. those mentioned above, when it is introduced as described into the polymer. These mixtures, also termed blends, may be prepared by mixing the powders, compacting, extrusion or melt pelletization or a similar method.

Polymeric materials encompass products which can be prepared from monomeric units by polymerization, polycondensation or polyaddition. Examples of these polymers a) are polyolefins (polyethylenes (HDPE, LDPE, LLDPE, VLDPE, etc.), polypropylene, polybutylene, COC etc. and copolymers of these), polystyrene, polyurethanes, polyester (e.g. PET, PBT, PBN, etc.), polyamides and polyacetals. Copolymers of these individual polymers are also included, as are blends of various polymers (e.g. ABS, SAN, etc.).

The examples below illustrate the invention.

EXAMPLE 1

A polymeric composition comprising
100.0 parts of polypropylene
0.05 part of Hostanox O 10®
0.1 part of calcium stearate
0.005 part of bis(diphenylphosphino)-2,2-dimethylpropane (compound (II))

is mixed by dry mixing and pre-extrusion at 210° C. The composition is then repeatedly extruded through a Göttfert single-screw extruder (270° C., d=20 mm, I:d=20, 50 min$^{-1}$, compression 1:3) and pelletized in a waterbath after cooling of the polymer melt. The meltflow index (MFI, ASTM D-1238-70, 230° C., 2.16 kg) and the Yellowness Index (YI, ASTM D1925-70, on pellets) are determined after the first, third and fifth pass.

EXAMPLE 2

A polymeric composition is prepared by the method of Example 1 except that instead of 0.005 part, 0.01 part of bis(diphenylphosphino)-2-2-dimethylpropane is used.

EXAMPLE 3

A polymeric composition is prepared by the method of Example 1 except that instead of 0.005 part, 0.02 part of bis(diphenylphosphino)-2-2-dimethylpropane is used.

EXAMPLE 4

A polymeric composition is prepared by the method of Example 1 except that instead of 0.005 part, 0.04 part of bis(diphenylphosphino)-2-2-dimethylpropane is used.

EXAMPLE 5

A polymeric composition is prepared by the method of Example 1, except that instead of 0.005 part of bis(diphenylphosphino)-2,2-dimethylpropane 0.005 part of 1,1,1-tris(diphenylphosphinomethyl)propane (compound (III)) is used.

EXAMPLE 6

A polymeric composition is prepared by the method of Example 1 except that instead of 0.005 part of bis(diphenylphosphino)-2,2-dimethylpropane 0.01 part of 1,1,1-tris(diphenylphosphinomethyl)propane (compound (III)) is used.

EXAMPLE 7

A polymeric composition is prepared by the method of Example 1 except that instead of 0.005 part of bis(diphenylphosphino)-2,2-dimethylpropane 0.02 part of 1,1,1-tris(diphenylphosphinomethyl)propane (compound (III)) is used.

EXAMPLE 8

A polymeric composition is prepared by the method of Example 1 except that instead of 0.005 part of bis(diphenylphosphino)-2,2-dimethylpropane 0.04 part of 1,1,1-tris(diphenylphosphinomethyl)propane (compound (III)) is used.

COMPARATIVE EXAMPLE 9

A polymeric composition is prepared using the method of Example 1 except that instead of 0.005 part of bis(diphenylphosphino)-2,2-dimethylpropane 0.005 part of Sandostab P-EPQ® (producer: Clariant AG) is used.

COMPARATIVE EXAMPLE 10

A polymeric composition is prepared using the method of Example 1 except that instead of 0.005 part of bis(diphenylphosphino)-2,2-dimethylpropane 0.01 part of Sandostab P-EPQ® (producer: Clariant AG) is used.

COMPARATIVE EXAMPLE 11

A polymeric composition is prepared using the method of Example 1 except that instead of 0.005 part of bis(diphenylphosphino)-2,2-dimethylpropane 0.02 part of Sandostab P-EPQ® (producer: Clariant AG) is used.

COMPARATIVE EXAMPLE 12

A polymeric composition is prepared using the method of Example 1 except that instead of 0.005 part of bis(diphenylphosphino)-2,2-dimethylpropane 0.04 part of Sandostab P-EPQ® (producer: Clariant AG) is used.

COMPARATIVE EXAMPLE 13

A polymeric composition is prepared by the method of Example 1, except that no phosphane or Sandostab P-EPQ® was used.

| Ex. No. | MFI [g/10 min] | | | YI | | |
|---|---|---|---|---|---|---|
| | 1$^{st}$ pass | 3$^{rd}$ pass | 5$^{th}$ pass | 1$^{st}$ pass | 3$^{rd}$ pass | 5$^{th}$ pass |
| 1 | 6.20 | 12.39 | 19.50 | 5.92 | 5.71 | 6.71 |
| 2 | 4.32 | 7.80 | 13.00 | 4.52 | 5.25 | 6.76 |
| 3 | 3.12 | 4.49 | 6.81 | 1.98 | 3.64 | 6.25 |
| 4 | 2.79 | 3.81 | 4.96 | 2.27 | 3.67 | 4.62 |
| 5 | 8.13 | 16.60 | 26.94 | 5.26 | 5.24 | 6.35 |
| 6 | 6.56 | 14.88 | 28.88 | 4.77 | 5.04 | 6.52 |
| 7 | 3.38 | 5.64 | 9.84 | 2.73 | 3.98 | 5.31 |
| 8 | 2.76 | 3.94 | 5.58 | 2.25 | 3.73 | 5.26 |
| 9 | 8.67 | 18.50 | 32.96 | 6.98 | 9.15 | 9.34 |
| 10 | 8.62 | 17.24 | 29.67 | 5.77 | 6.58 | 4.07 |
| 11 | 7.04 | 17.84 | 32.54 | 5.64 | 6.20 | 5.99 |
| 12 | 4.48 | 8.10 | 13.54 | 6.92 | 5.58 | 5.05 |
| 13 | 10.06 | 20.69 | 35.92 | 6.77 | 6.98 | 7.44 |

The following conclusions can be drawn from these results of Examples 1 to 13:

Compared with the base-level of stabilization (Ex. 13), the conventional stabilizer Sandostab P-EPQ®, a phosphonite, exhibits only marginal stabilizing action below 400 ppm, detectable in that the values for the MFI at all of the passes are just very slightly smaller than in Ex. 13. Polypropylene degrades with reduction of chain length and therefore of viscosity, giving an increase in MFI values.

In contrast to this, the series of trials 1–4 and, respectively, 5–8 clearly show that effectiveness begins when the concentration used is as low as 50 ppm. Since the difference between specimens 1 and, respectively, 5 and specimen 13 is significant, concentrations <50 ppm may also be assumed to be effective.

Analogous conclusions may also be reached for the colour values (YI). Here, again, it can be seen that the claimed compounds (Ex. 1–8) have markedly better effectiveness than the conventional processing stabilizer (9–12 and, respectively, 13).

EXAMPLE 14

A polymeric composition comprising
100.0 parts of linear-low-density polyethylene (LLDPE)
0.03 part of Hostanox O 16®
0.05 part of calcium stearate
0.005 part of bis(diphenylphosphino)-2,2-dimethylpropane (compound (II))

is mixed by dry mixing and pre-extrusion at 210° C. The composition is then repeatedly extruded through a Göttfert single-screw extruder (230° C., d=20 mm, I:d=20, 70 min$^{-1}$, compression 1:3) and pelletized in a waterbath after cooling of the polymer melt. The meltflow index (MFI, ASTM D-1238-70, 190° C., 2.16 kg) and the Yellowness Index (YI, ASTM D1925-70, on pellets) are determined after the first, third and fifth pass.

EXAMPLE 15

A polymeric composition is prepared by the method of Example 14 except that instead of 0.005 part, 0.01 part of bis(diphenylphosphino)-2-2-dimethylpropane is used.

EXAMPLE 16

A polymeric composition is prepared by the method of Example 14 except that instead of 0.005 part, 0.02 part of bis(diphenylphosphino)-2-2-dimethylpropane is used.

EXAMPLE 17

A polymeric composition is prepared by the method of Example 14 except that instead of 0.005 part, 0.04 part of bis(diphenylphosphino)-2-2-dimethylpropane is used.

COMPARATIVE EXAMPLE 18

A polymeric composition is prepared using the method of Example 14 except that instead of 0.005 part of bis(diphenylphosphino)-2,2-dimethylpropane 0.005 part of Sandostab P-EPQ® (producer: Clariant AG) is used.

COMPARATIVE EXAMPLE 19

A polymeric composition is prepared using the method of Example 14 except that instead of 0.005 part of bis(diphenylphosphino)-2,2-dimethylpropane 0.01 part of Sandostab P-EPQ® (producer: Clariant AG) is used.

COMPARATIVE EXAMPLE 20

A polymeric composition is prepared using the method of Example 14 except that instead of 0.005 part of bis(diphenylphosphino)-2,2-dimethylpropane 0.02 part of Sandostab P-EPQ® (producer: Clariant AG) is used.

COMPARATIVE EXAMPLE 21

A polymeric composition is prepared using the method of Example 14 except that instead of 0.005 part of bis(diphenylphosphino)-2,2-dimethylpropane 0.04 part of Sandostab P-EPQ® (producer: Clariant AG) is used.

COMPARATIVE EXAMPLE 22

A polymeric composition is prepared by the method of Example 14, except that no phosphane or Sandostab P-EPQ® was used.

| Ex. No. | MFI [g/10 min] | | | YI | | |
|---|---|---|---|---|---|---|
| | 1$^{st}$ pass | 3$^{rd}$ pass | 5$^{th}$ pass | 1$^{st}$ pass | 3$^{rd}$ pass | 5$^{th}$ pass |
| 14 | 2.18 | 1.91 | 1.65 | 0.7 | 4.3 | 4.8 |
| 15 | 2.21 | 2.06 | 1.78 | 1.0 | 4.3 | 5.3 |
| 16 | 2.21 | 2.18 | 1.96 | 0.1 | 4.3 | 5.9 |
| 17 | 2.24 | 2.24 | 2.23 | −1.0 | 1.8 | 4.5 |
| 18 | 2.07 | 1.87 | 1.62 | 2.9 | 5.7 | 7.0 |
| 19 | 2.18 | 1.93 | 1.63 | 1.6 | 4.8 | 6.5 |
| 20 | 2.21 | 2.02 | 1.73 | 0.8 | 5.4 | 7.2 |
| 21 | 2.23 | 2.16 | 1.94 | 1.1 | 5.6 | 6.4 |
| 22 | 2.10 | 1.76 | 1.44 | 3.4 | 5.6 | 4.7 |

The following conclusions may be drawn from these results of Examples 14 to 22:
Even at a concentration of 50 ppm, the stabilizer of the invention (Ex. 14–17) exhibits significantly better action than the conventional phosphonite-based Sandostab P-EPQ®. The stabilizing action is evident from a comparison with the formulation having only base-level stabilization (Ex. 22). LLDPE usually degrades with crosslinking and therefore with a rise in viscosity, giving lower MFI values.
For the compound of the invention, it can be seen in Ex. 17 that the melt flow stabilization obtained is virtually ideal, with MFI values remaining the same across the five extrusion processes.
Analogous conclusions may also be reached for the colour values (YI). Here, again, it can be seen that the claimed compounds (Ex. 14–17) have markedly better effectiveness than the conventional processing stabilizer (18–21 and, respectively, 22).

EXAMPLE 23

A polymeric composition comprising
100.0 parts of high-density polyethylene (HDPE)
0.05 part of Hostanox O 10®
0.10 part of calcium stearate
0.005 part of bis(diphenylphosphino)-2,2-dimethylpropane (compound (II))

is mixed by dry mixing and pre-extrusion at 210° C. The composition is then repeatedly extruded through a Göttfert single-screw extruder (240° C., d=20 mm, I:d=20, 70 min$^{-1}$, compression 1:3) and pelletized in a waterbath after cooling of the polymer melt. The meltflow index (MFI, ASTM D-1238-70, 190° C., 2.16 kg) is determined after the first, third and fifth pass.

EXAMPLE 24

A polymeric composition is prepared by the method of Example 23 except that instead of 0.005 part, 0.01 part of bis(diphenylphosphino)-2-2-dimethylpropane is used.

EXAMPLE 26

A polymeric composition is prepared by the method of Example 23 except that instead of 0.005 part, 0.02 part of bis(diphenylphosphino)-2-2-dimethylpropane is used.

EXAMPLE 26

A polymeric composition is prepared by the method of Example 23 except that instead of 0.005 part, 0.04 part of bis(diphenylphosphino)-2-2-dimethylpropane is used.

COMPARATIVE EXAMPLE 27

A polymeric composition is prepared using the method of Example 23 except that instead of 0.005 part of bis(diphenylphosphino)-2,2-dimethylpropane 0.005 part of Sandostab P-EPQ® (producer: Clariant AG) is used.

COMPARATIVE EXAMPLE 28

A polymeric composition is prepared using the method of Example 23 except that instead of 0.005 part of bis(diphenylphosphino)-2,2-dimethylpropane 0.01 part of Sandostab P-EPQ® (producer: Clariant AG) is used.

COMPARATIVE EXAMPLE 29

A polymeric composition is prepared using the method of Example 23 except that instead of 0.005 part of bis(diphenylphosphino)-2,2-dimethylpropane 0.02 part of Sandostab P-EPQ® (producer: Clariant AG) is used.

COMPARATIVE EXAMPLE 30

A polymeric composition is prepared using the method of Example 23 except that instead of 0.005 part of bis(diphenylphosphino)-2,2-dimethylpropane 0.04 part of Sandostab P-EPQ® (producer: Clariant AG) is used.

COMPARATIVE EXAMPLE 31

A polymeric composition is prepared by the method of Example 23, except that no phosphane or Sandostab P-EPQ® was used.

|         | MFI [g/10 min] |         |         |
|---------|----------------|---------|---------|
| Ex. No. | 1st pass       | 3rd pass | 5th pass |
| 23      | 6.58           | 6.44    | 6.04    |
| 24      | 6.59           | 6.59    | 6.54    |
| 25      | 6.58           | 6.58    | 6.57    |
| 26      | 6.58           | 6.57    | 6.57    |
| 27      | 6.51           | 6.17    | 5.74    |
| 28      | 6.53           | 6.24    | 5.78    |
| 29      | 6.58           | 6.31    | 5.88    |
| 30      | 6.62           | 6.62    | 6.63    |
| 31      | 6.5            | 6.06    | 5.57    |

The following conclusions may be drawn from these results of Examples 23 to 31:

- Even from very low concentrations of about 100 ppm of the stabilizer of the invention (Ex. 24–26) effective suppression of the MFI changes caused by degradation reactions during processing is obtained. In contrast, the comparative substance (Ex. 27–30) is capable of exhibiting similarly effective action only at the highest concentration studied, 400 ppm (Ex. 30).
- Even with the lowest concentration studied of the substance (II) of the invention, only 50 ppm (Ex. 23), very good stabilizing action is present, detectable in that there is only a slight fall-off in the MFI value from the first to the fifth pass, and also by comparison with Ex. 31. It may therefore be assumed that there is also stabilization action at concentrations <50 ppm.

The invention claimed is:

1. Composition comprising as component a) one or more polymers selected from the group consisting of polystyrene, polyurethanes, polyester, polyamides, polyacetals, copolymers thereof and blends thereof
    and as component b) one or more compounds selected from the group consisting of formula (II), (III) and (IV)

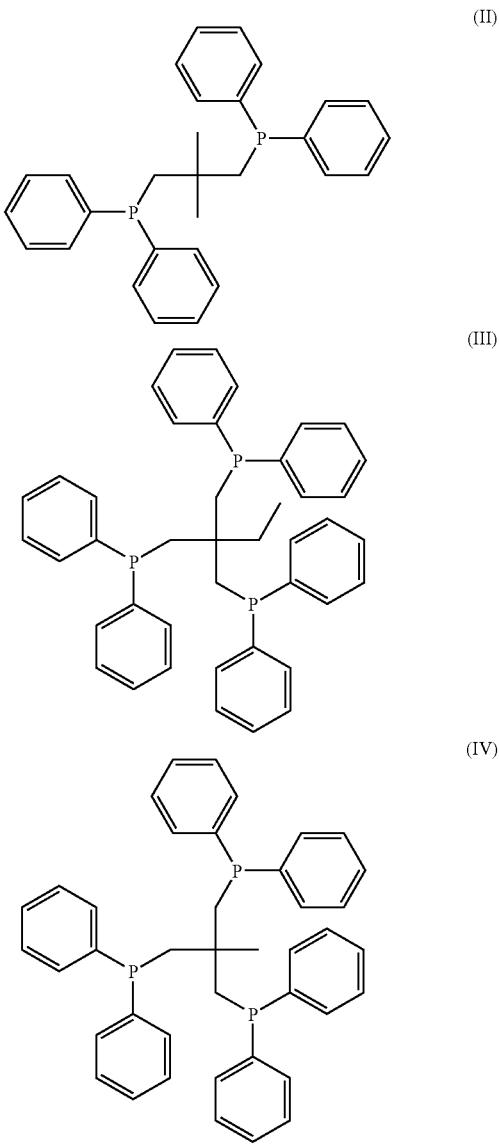

at an amount from 10 to 400 ppm based on the polymer in the composition.

2. Composition according to claim 1, comprising 25 to 350 ppm of component b) based on the polymer in the composition.

3. Composition according to claim 1 comprising at least one additive selected from the group consisting of antioxidants, acid scavengers UV stabilizers, sterically hindered amines (HALSs), UV absorbers, UV quenchers, antistats, flame retardants, lubricants, plasticizers, nucleating agents, metal deactivators, biocides, impact modifiers, fillers, pigments and fungicides.

4. Process for stabilizing polymers with respect to exposure to heat or mechanical stress during processing, comprising the step of adding to the polymer to be stabilized 10 to 400 ppm, based on the polymer to be stabilized, of a compound of the formulae (II) to (IV) according to claim 1, wherein the polymer is selected from the group consisting of polystyrene, polyurethanes, polyester, polyamides, polyacetals, copolymers thereof and blends thereof.

5. Process according to claim 4, wherein the amount of a compound of the formulae (II) to (IV) is from 25 to 350 ppm.

6. Process according to claim 3, wherein the antioxidants are selected from the group consisting of sterically hindered phenols, secondary aromatic amines and thioester, the acid scavengers are selected from the group consisting of sodium stearate, magnesium stearate, sinc stearate, calcium stearate, sodium lactate, magnesium lactate, zinc lactate, clacium lactate, hydrotalcites and alkoxylated amines, and the UV quenchers are selected from the group consisting of nickel complexes, benzoates, and substituted benzoates.

* * * * *